Patented May 15, 1928.

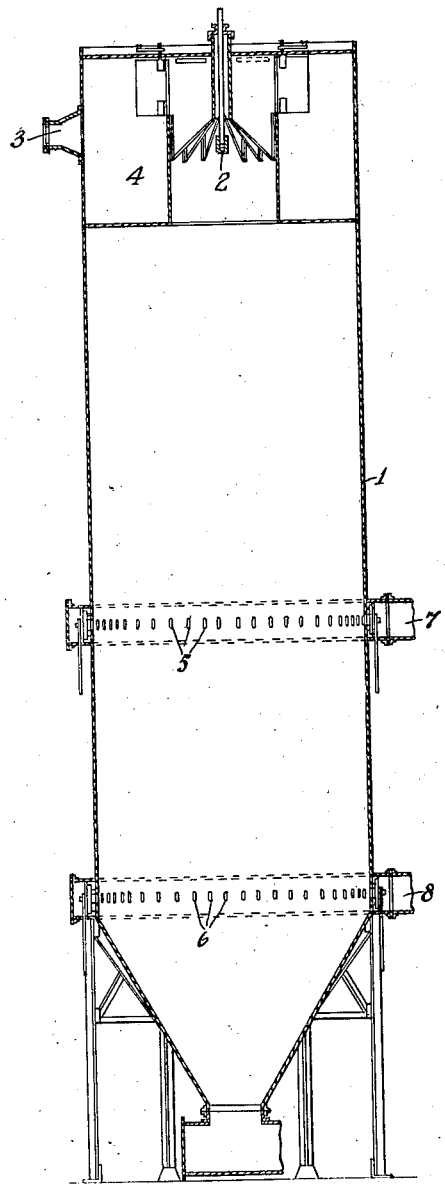

1,670,101

UNITED STATES PATENT OFFICE.

WALTER H. DICKERSON, OF EAST ORANGE, NEW JERSEY, ASSIGNOR TO INDUSTRIAL WASTE PRODUCTS CORPORATION, OF DOVER, DELAWARE, A CORPORATION OF DELAWARE.

METHOD OF DEHYDRATING LIQUIDS AND PRODUCTS OBTAINED THEREBY.

Application filed November 3, 1922, Serial No. 598,746. Renewed September 26, 1927.

The invention relates to a method for treating liquids containing low melting point constituents, more especially sugars or like substances; and, also, to the novel dehydrated and powdered product obtained thereby. The present invention is a continuation in part of my previously filed applications for U. S. Letters Patents, Serial No. 576,384, filed July 20, 1922, and Serial No. 579,297, filed August 2, 1922.

It has for its object to extract, for example from liquid products containing sugar, such as fruit juices, cane sugar juice, molasses, distillery slop liquors, glucose syrup and other liquids containing substances of low melting point characteristics and usually of hygroscopic properties, the sugar or other content in dried powdered form, and anhydrous to a more or less degree. In the production of glucose, for example, the present commercial methods are not conducive to the production of a dried powdered product. In the well-known process for producing glucose, starch is treated with acid and the conversion product then evaporated, the concentrated liquid product being of a consistency of 40° to 42° Baumé and known as glucose. In addition, there has been produced by the conversion of starch thru hydrolyzing to a considerably further degree, a product known as grape sugar, and which solidifies in the concentrated solution.

The glucose, however, remains as a liquid of viscous consistency which does not admit of abstraction of the contained moisture in the ordinary manner of heating in mass, as the temperature necessary to drive off the remaining moisture would be such as to be injurious to the glucose and cause decomposition of same.

It is the object of the present invention to treat liquids of this character, such as the sugar containing liquids, in manner to avoid this injurious effect on the constituents; and, furthermore, to preserve, in the case of glucose, the degree of sweetness of the original syrup; also, to obtain the same in a dry powdered condition.

To this end, the syrup or viscous liquid aforesaid is sprayed or atomized under suitable pressure into heated air or gases at the proper temperatures to evaporate from the finely-divided sprayed material the desired degree of moisture. For example, the atomizing or spraying may be effected at pressures as high as 2000 lbs. per square inch or more, and the temperature of the heated gaseous medium to which the sprayed material is initially subjected may be as high as 500° F. to 1000° F. However, lower temperatures may be employed, but larger volumes of the drying gaseous medium will be required in such cases.

Before spraying the material to be dried, it may be desirable to preliminarily concentrate same, as by removing a portion of the water by refrigeration; or, as in the case of glucose; the original solution as it comes from the conversion process and at a specific gravity of from 12° to 18° Baumé may, after filtering, be sprayed directly for complete dehydration to anhydrous powdered product.

In the drying of solutions of materials containing low melting point constituents, as sugars, and more especially such solutions as fruit juices, etc., which contain both low melting point sugars and sugars of highly hydroscopic properties, it is necessary not only to reduce the temperature to which the dry powdered product is exposed to a point sufficiently below the melting point of the particular constituent of low melting point, but also to have the drying gaseous medium of sufficiently low humidity that the finished product will not absorb moisture therefrom when exposed to the low temperature, as provided, for example, by a zone of cooling gas.

The final temperature to which the material is subjected should thus be below the melting point of the material and approximates in the case of glucose generally 180° F., care being taken, also, in the desiccating operation that the desiccating gaseous medium does not become saturated to such an extent as to affect the material which, in the case of sugars, may be strongly hygroscopic. The use of these extremely high temperatures for desiccation is possible as the result of a distinct refrigerating effect produced in or on the particles and due to the intense evaporation of the moisture content, the material itself not being subjected to the actual high temperatures of the drying gas, except the final temperature of evaporation. It has been found that while the individual particles in suspension are substantially dry at high temperatures, yet the material in most cases will be in a somewhat melted condition and would adhere to any collecting surface with which it came in contact. Should, therefore, the final temperature of the drying gas upon completion of evaporation be above the melting point of the material desiccated, the said material must be reduced in temperature by subjecting the same at once to a suitable lower temperature. This may be effected by chilling the entire body and product in suspension thru the introduction of a much cooler gas, or introducing the product into a cooling zone, or by so balancing the amount of evaporation to the amount of heat in the drying gas that the final temperature at the completion of the drying operation will be at the desired point, for example 180° F., and as is more fully set forth in my aforesaid applications. It may be found necessary, furthermore, where climatic conditions are such that the natural atmospheric air is hot and of high humidity, to first dehydrate the air prior to its use, as well as to dehydrate any further air employed as a cooling medium. Of course, in climates of naturally low humidity, such dehydration will not be necessary.

The novel process may be carried out, for example, in a vertically disposed drying chamber provided by the cylindrical casing 1 which is shown in the drawing, said casing being of appropriate dimensions and into the top of which the material to be dried, and which is in a more or less liquid condition, is sprayed through a spray nozzle 2 of any well-known or special type. Simultaneously therewith, heated gas of the proper degree of temperature is introduced thru the top of the casing about the spray nozzle 2, being supplied thru a duct 3 and distributing compartment 4. The material thus sprayed becomes quickly dried into small globular particles which in their further travel thru the drying chamber are arranged to pass through a cooling zone or zones to chill the same to the desired final temperature, preliminary to withdrawal from said casing. These zones may conveniently be provided thru the medium of one or more sets of annular openings 5 and 6 respectively disposed in the wall of the casing one at its lower portion and thru which a gaseous cooling medium may be directed from suitable supply ducts 7 and 8, respectively.

The product in its final condition will, therefore, have been chilled, immediately upon completion of the evaporation, to a temperature below its melting point. It may then be collected as a dry, substantially anhydrous powder, the extent to which the moisture has been removed therefrom being controlled by the temperature conditions and period to which the same has been subjected to the effect thereof.

In the case of glucose treated in this manner, the resulting product will be found to consist of globular, anhydrous particles which preserve the degree of sweetness of the original syrup obtained from the usual starch conversion process; whereas, the process heretofore employed for producing ordinary glucose from treatment of starch with acid, results in impairment of the sweetness of the product in its natural state. This is probably as a result of the boiling down operation in vacuum pans and no doubt due to the effect of the long exposure of the syrup to the heat required in the evaporation process.

I claim:—

1. The method of producing anhydrous powdered glucose, which consists in subjecting a water solution of glucose in a state of minute subdivision to a dehydrating gaseous medium, and at the completion of the drying operation subjecting the desiccated product immediately and while in suspension to a temperature below the melting point of the powdered product.

2. The method of producing anhydrous powdered glucose, which consists in subjecting a water solution of glucose in a state of minute subdivision to a dehydrating gaseous medium at an initial temperature of from 500° F. to 1000° F., and at the completion of the drying operation subjecting the desiccated product immediately and while in suspension to the action of a gas at a temperature below the terminal temperature of the gaseous medium and the melting point of the powdered product.

3. The method of producing anhydrous powdered glucose, which consists in subjecting a water solution of glucose in a state of minute subdivision to a dehydrating gaseous medium at an initial temperature of from 500° F. to 1000° F., and at the completion of the drying operation subjecting the desiccated product immediately and while in suspension to a temperature below 180° F.

Signed at New York, in the county of New York and State of New York, this 31st day of October, A. D. 1922.

WALTER H. DICKERSON.